Aug. 15, 1950 M. J. GJERTSON 2,519,243
FERTILIZER SPREADER
Filed Jan. 17, 1946 2 Sheets-Sheet 2
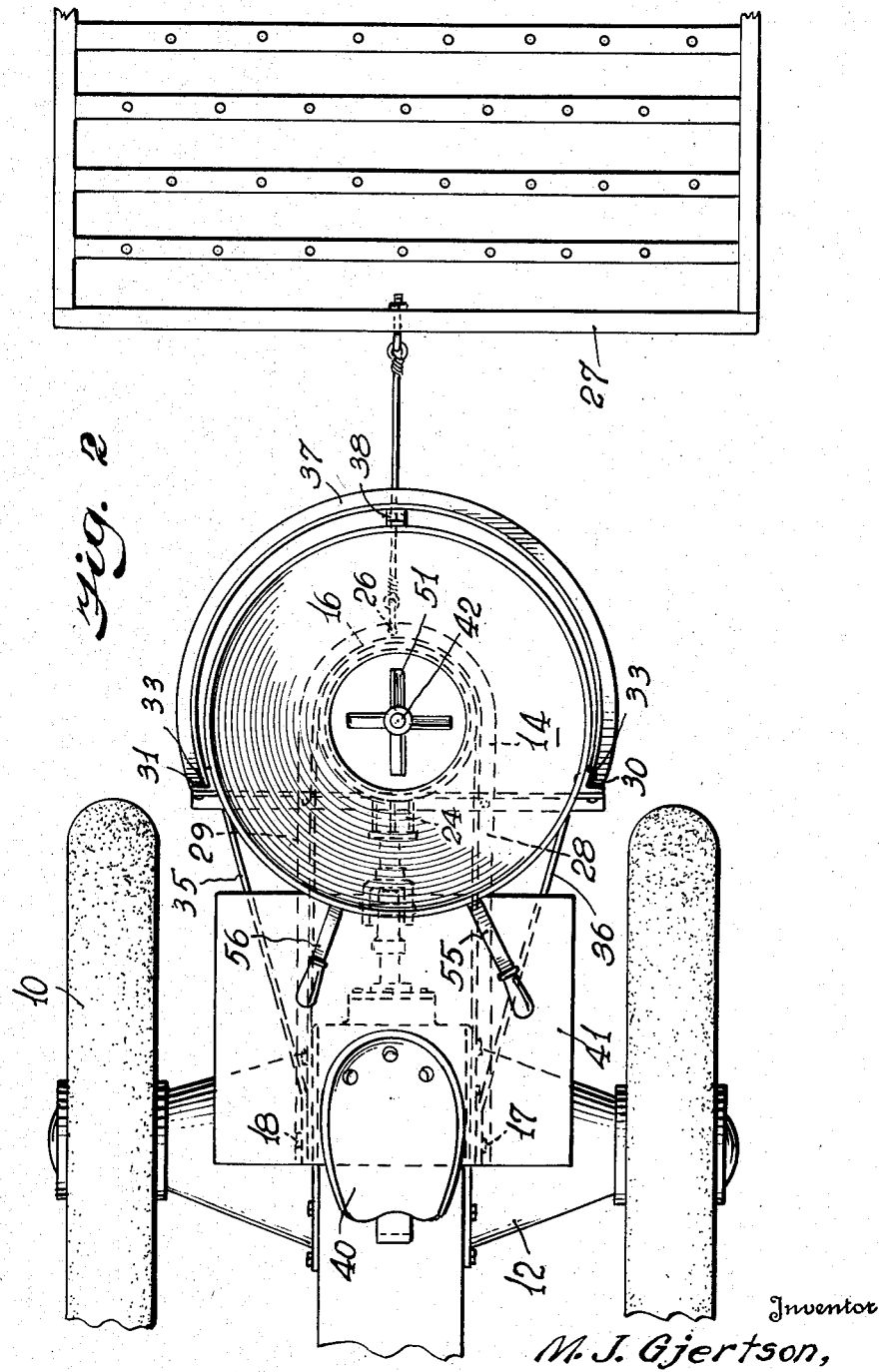
Inventor
M. J. Gjertson,
By Wilfred E. Lawson
Attorney Patented Aug. 15, 1950

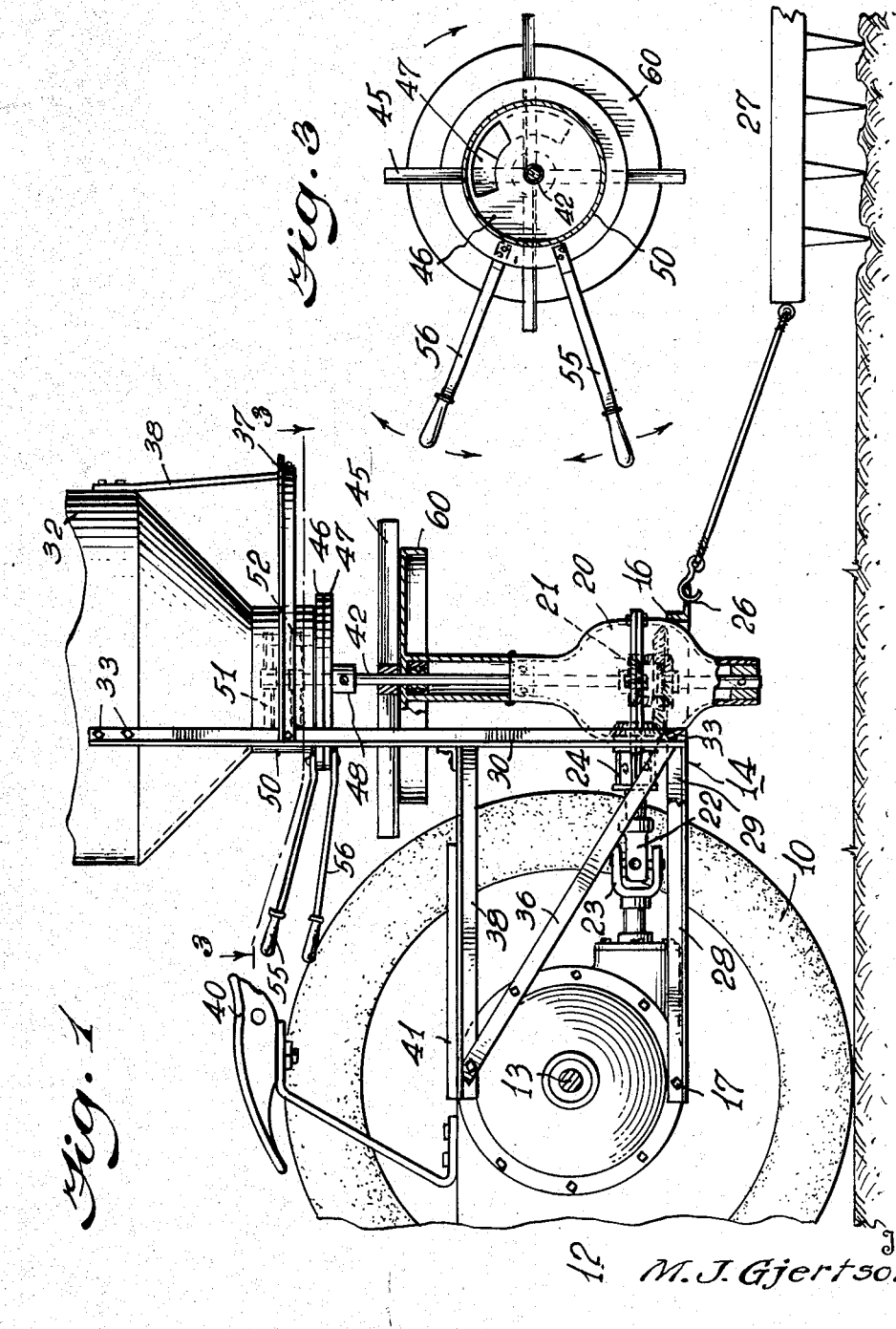

2,519,243

UNITED STATES PATENT OFFICE 2,519,243

FERTILIZER SPREADER

Melvin J. Gjertson, Worthington, Minn., assignor of one-half to Milford Davis, Reading, Minn.

Application January 17, 1946, Serial No. 641,745

2 Claims. (Cl. 275—8)

The present invention relates generally to a fertilizer spreader arrangement and more particularly to a combined novel spreader and novel power take-off and hitch arrangement for use with a tractor.

One object of the present invention is to provide a novel tractor power take-off, including an implement hitch carried by the spreader whereby combined operations, such as tilling the soil and fertilizing may be performed in one operation.

Another object is to provide novel means for directly driving a fertilizer spreader from a power take-off on a tractor.

Another object of the invention is to provide in a fertilizer spreader a novel fertilizer feed, including a double disc arrangement, whereby both the position of the dropped fertilizer may be reasonably predetermined and the quantity dropped may be controlled.

Further objects and advantages of my invention are disclosed in the following specification and claims, together with the accompanying drawings.

Figure 1 shows a rear side elevational view of a tractor with my novel spreader attached partly in section.

Figure 2 is a rear top plan view of the spreader attached, with the tractor partly shown.

Figure 3 is a top plan view of the spreader attached to the tractor taken along line 3—3 through the fertilizer hopper, as shown in Figure 1.

Referring in detail to the several views of the drawings and first with particular reference to Figures 1 and 2, numeral 10 represents the body of a tractor to which the spreader is attached. At the rear end of the tractor frame is the usual differential housing 12, and rear axle 13, from which rearwardly extends a tractor draw bar 14. This draw bar includes a yoke 16 attached to the housing 12 by suitable means, such as bolts 17 and 18.

The yoke 16 encircles a gear casing 20, inside of which may be mounted a bevel gear drive or the like, such as 21, which is driven by a power take-off shaft 22 leading from the tractor. This shaft 22 may include a universal coupling 23 intermediate its length to allow for any necessary vertical or horizontal adjustments of the spreader with respect to the tractor and the ground. The shaft 22 just before it connects through to the interior of the gear casing 20 is journalled in a bearing 24 and extends from the tractor to the spreader between the arms of the draw bar 14.

Defined in the closed portion of the yoke 16 is a hitch arrangement 26, for the purpose of drawing behind the spreader a harrow 27 or other ground-tilling device. Thus, it is possible with the present invention to fertilize and mix the same into the soil in one operation.

Secured to each arm 28 and 29 of the yoke-like draw bar 14 is a pair of vertical bars 30 and 31 offset toward the top so as to converge and contact with the top portion of a fertilizer hopper 32. These bars are secured to the arms 28 and 29, and sides of the hopper 32 by any suitable means, such, for example, as rivets or bolts, generally designated as 33. Each bar 30 and 31 is secured to the yoke arms and extending diagonally upward from these projected ends of the bars are braces 35 and 36, see Figure 2.

The braces 35 and 36 are joined to the ends of a pair of bars, such as 38 shown in Figure 1, which are bolted at these ends to spaced portions of the tractor body 10 on each side below the seat 40. From these bolted connections between the tractor body and the ends of braces 35 and 36, these bars typified by numeral 38, are secured at their other ends to each of the vertical hopper bars 30 and 31. Thus, there is provided a pair of substantially parallel horizontal bars, and mounted on these bars is a platform 41, adapted to support surplus bags of fertilizer for use in hopper 32. To prevent undesirable vibration in hopper 32, a semi-circular bar 37 may be secured to bars 30 and 31, and be connected to the lower part of the hopper by a strap 38.

Extending up into the hopper 32 from the gear casing 20 is a shaft 42. This shaft is rotated by the gearing 21 in casing 20 and actuates the fertilizer spreader mechanism.

This mechanism comprises a fan 45 mounted on the shaft 42 for rotation therewith below a pair of fertilizer discharge control discs 46 and 47 secured by a collar 48 for rotatable adjustment on the reduced discharge neck 50 of hopper 32. The shaft 42 extends into the hopper for a predetermined distance. Mounted on the shaft 42 inside the hopper are agitators 51 and 52 adapted to break up the fertilizer for more efficient control of the discharge of the same through discs 46 and 47.

Each disc 46 and 47 has a particular function in the operation of the spreader. The upper disc 46 contains a plurality of apertures in one sector thereof through which the fertilizer feeds to the lower disc 47, which likewise contains similar apertures in one sector. The upper disc 46 is adjustable by link 55, so as to angularly position the apertures in the disc in different directions, thereby to direct the fertilizer toward the ground at various angles from the spreader; while the lower disc 47 is adjustable by link 56. Both of these links or levers are preferably adjacent the driver's seat 40, and the corresponding apertures of the sectors of the upper and lower discs may be restricted or increased in size to regulate the quantity of fertilizer discharged to the distributing fan 45 on the shaft 42.

The fan 45 on its upper face, includes a plurality of blades, which radially direct the fertilizer from a plate 60 fixed below the fan to the ground.

From the foregoing description, the operation should be apparent and further reference thereto would only be repetition. Also, from the foregoing, it may be observed that I have provided a tractor mounted and driven fertilizer spreader arranged so that the fertilizing and tilling operation may be combined, and a novel spreader designed, so that by a simple adjustment the fertilizer shut-off and feed control may be regulated to throw an equal amount of fertilizer to either side of the tractor, and also control the quantity thereof so discharged. Provision is also made for carrying an extra supply of fertilizer by a platform attachment between the tractor and the spreader.

While I have illustrated and described the several features of my invention more or less specifically, I wish it understood that various changes may be resorted to within the scope of the appended claims.

What I claim is:

1. In a fertilizer distributor of the character described, means for mounting the distributor upon the rear end of a tractor for connection with a power take-off, comprising a lower horizontally disposed substantially U-shaped frame, means for securing the lower part of the tractor differential housing between two sides of the frame at one end thereof whereby the opposite end of the frame is disposed rearwardly of the tractor, the frame being disposed in a plane below the tractor power take-off, a second frame disposed horizontally at an elevation above the tractor power-take-off and secured to the differential housing, vertical standards secured to the two frames and extending a substantial distance upwardly above the upper frame, a material hopper mounted between the upper ends of said standards and having a downwardly directed outlet, and power driven distributing mechanism disposed below the hopper outlet, said mechanism including a gear housing secured to and supported in the outer end of the first mentioned frame and means for establishing a driving connection between the power take-off and said distributing mechanism.

2. A fertilizer material spreader designed for attachment to a tractor having a power take-off, comprising a drive mechanism for connection with said power take-off including a vertical rotatably supported shaft, a relatively large plate supported horizontally with said vertical shaft passing centrally therethrough, a material hopper supported above and in spaced relation with the plate, said hopper having a downwardly directed outlet concentric with the vertical shaft, said vertical shaft being extended into said hopper outlet, a plurality of fan blades secured to the vertical shaft to be rotated thereby over and in close proximity to the top surface of the plate, agitator blades carried by the upper end of the vertical shaft and disposed in the hopper outlet, and means for controlling the flow of material through the hopper outlet onto said plate comprising a pair of apertured plates disposed one upon the other and each having an outlet opening, the said pair of apertured plates being positioned to close said hopper outlet, the said apertured plates being both rotatable around the vertical shaft between the hopper outlet and said fan blade, and means for turning the plates together or relative to one another through an arc of at least 180° whereby to discharge the material onto the top of the first mentioned plate upon either of two sides of the vertical shaft.

MELVIN J. GJERTSON.

REFERENCES CITED

The following references are of record in the file of this patent:

UNITED STATES PATENTS

| Number | Name | Date |
|---|---|---|
| 1,011,071 | Mehlberger | Dec. 5, 1911 |
| 1,619,795 | Roby | Mar. 1, 1927 |
| 1,916,781 | Blatchford | July 4, 1933 |
| 2,171,031 | Graham et al. | Aug. 29, 1939 |
| 2,334,376 | Bauer | Nov. 16, 1943 |
| 2,451,128 | Thiesse | Oct. 12, 1948 |